United States Patent [19]

Manley et al.

[11] Patent Number: 5,612,418
[45] Date of Patent: Mar. 18, 1997

[54] PEROXIDE-CURED BLENDS OF POLYACRYLATES AND PARTIALLY HYDROGENATED NITRILE RUBBERS

[75] Inventors: Paul E. Manley, Louisville, Ky.; Richard J. Flecksteiner, Crystal Lake, Ill.; Michael E. Wood, Floyds Knobs, Ind.

[73] Assignee: Zeon Chemical Incorporated, Louisville, Ky.

[21] Appl. No.: 588,516

[22] Filed: Jan. 18, 1996

[51] Int. Cl.$^6$ .............................. C08L 33/20; C08L 51/04
[52] U.S. Cl. ................................ 525/222; 525/238
[58] Field of Search ..................... 525/222, 238

[56] References Cited

U.S. PATENT DOCUMENTS

| | | | |
|---|---|---|---|
| 4,912,186 | 3/1990 | Ohhara et al. | 526/334 |
| 4,968,753 | 11/1990 | Oyama et al. | 525/305 |
| 5,051,480 | 9/1991 | Coran | 525/227 |
| 5,194,540 | 3/1993 | Yamamoto et al. | 526/222 |

FOREIGN PATENT DOCUMENTS 5-214196  8/1993  Japan.

*Primary Examiner*—Thomas Hamilton, III
*Attorney, Agent, or Firm*—Armstrong, Westerman, Hattori, McLeland & Naughton

[57] ABSTRACT

Blends of a polyacrylate elastomer with a partially hydrogenated rubber, when peroxide-cured, provide a product which is excellent in resistance to degradation by heat or contact with oil, and which is particularly suitable for making belts, hoses, gaskets and the like for use in automobile engines.

12 Claims, No Drawings

PEROXIDE-CURED BLENDS OF POLYACRYLATES AND PARTIALLY HYDROGENATED NITRILE RUBBERS

This invention relates to peroxide-curable blends of acrylate elastomers and partially hydrogenated nitrile rubbers, and to the blends which have been peroxide-cured. The cured blends exhibit excellent resistance to the degrading effects of oil and heat and are particularly useful as belts, hoses, seals, gaskets and the like in automobile engines.

BACKGROUND OF THE INVENTION

Polyacrylates are elastomeric polymers or copolymers of acrylic acid esters having a saturated main chain with the ester groups constituting side chains on the main chain. Polyacrylates are resistant to ozone and to aging in air at moderately elevated temperatures up to about 200° C., and resist swelling, hardening, and other changes that take place when contacted with hot oils in an automobile engine.

Partially hydrogenated nitrile rubbers have excellent resistance to degradation when contacted by hot oils but are not as resistant to high temperatures as are polyacrylates. Unlike polyacrylates made by polymerizing mixtures of alkyl acrylate esters, partially hydrogenated nitrile rubbers contain carbon-carbon unsaturation and are readily peroxide-curable. Peroxide curing is advantageous in that a good cure is obtained with a minimum of scorch (premature crosslinking during cure), and the cured product, where the polymer chains are crosslinked by carbon-carbon linkages, is generally more stable than a product obtained by vulcanization with nitrogen- or sulfur-containing compounds.

It is, therefore, an object of the present invention to provide a blend of elastomers which can be peroxide-cured to yield a cured product which is resistant to deterioration caused by exposure to both heat and oil.

BRIEF SUMMARY OF THE INVENTION

It has now been discovered that the desirable properties of oil-resistance and high service temperature in a blend of elastomers can be realized in a peroxide-cured composition which comprises from 10 to 90 parts by weight of a particular polyacrylate elastomer and 90 to 10 parts by weight of a partially hydrogenated nitrile rubber.

BRIEF DESCRIPTION OF THE INVENTION

In one composition aspect, the present invention is a peroxide-cured blend comprising:

10 to 90 parts by weight of a polyacrylate elastomer comprising at least 10 mole % of the structural unit

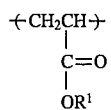

wherein $R^1$ is a $C_{4-8}$ alkyl group;
up to 30 mole % and preferably 20 to 30 mole % of the structural unit

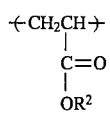

wherein $R^2$ is an alkoxyalkyl group containing 2–12 carbon atoms;
and the balance to a total of 100 mole % of the structural unit

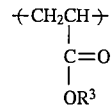

wherein $R^3$ is a $C_{1-3}$ alkyl group; and
90 to 10 parts by weight of a partially hydrogenated nitrile rubber having a degree of unsaturation of from 0.1 to 20%.

Particularly preferred are blends wherein the polyacrylate elastomer additionally contains 1 to 10% of structural units derived from acrylonitrile. Such polyacrylate elastomers comprise at least 10 mole % of the structural unit

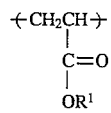

wherein $R^1$ is a $C_{4-8}$ alkyl group;
up to 30 mole % and preferably 20 to 30 mole % of the structural unit

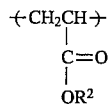

wherein $R^2$ is an alkoxylakyl group containing 2–12 carbon atoms;
1 to 20 mole % of the structural unit

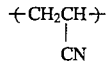

and the balance to a total of 100 mole % of the structural unit

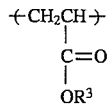

wherein $R^3$ is a $C_{1-3}$ alkyl group.

The present invention also contemplates curable compositions comprising the above-described blends and containing a peroxide curing system, particularly a peroxide curing system comprising an organic peroxide and m-phenylenediamine bis-maleimide.

DETAILED DESCRIPTION OF THE INVENTION

The polyacrylate elastomers utilized in practicing the method of the present invention are copolymers formed by copolymerizing a mixture containing two alkyl acrylates and containing at least 10 mole % of a $C_{4-8}$ acrylate, wherein the alkyl groups may be straight-chain or branched-chain alkyl groups such as isobutyl, n-pentyl, isoamyl, n-hexyl, 2-ethylhexyl and n-octyl, with n-butyl acrylate being preferred. The other alkyl acrylate monomer may be a $C_{1-3}$ acrylate, such as methyl, ethyl or propyl acrylate, where the alkyl groups may be straight-chain or branched-chain alkyl groups; and/or an alkoxyalkyl group containing 2–12 carbon atoms, such as methoxyethyl, methoxymethyl, ethoxyethyl, butoxyethyl and ethoxypropyl and with methoxyethyl being preferred. Preferably, the mixture may contain 1 to 20 mole %, of structural units derived from acrylonitrile. These polyacrylates do not contain reactive sites, such as chlorine or an epoxy group in their side chains, characteristic of sulfur and nitrogen-vulcanizable polyacrylates.

Polyacrylate elastomers or rubbers are prepared by emulsion, suspension, solution or bulk polymerization. Emulsion and suspension polymerization are more commonly employed, and polymerization is generally initiated by free-radical generating agents. Methods for making polyacrylates are well known to those skilled in the art and are not part of the present invention.

The nitrile rubbers blended with the polyacrylate elastomers are partially hydrogenated copolymers of 75–25 parts of 1,3-butadiene and 25–50 parts acrylonitrile having a degree of unsaturation of from 0.1 to 20%. Partially hydrogenated nitrile rubbers having a degree of unsaturation lower than 0.1% are not readily peroxide curable. And those having a degree of unsaturation above 20% are less resistant to heat aging and to attack by ozone.

The curable blends of the present invention are cured by heating at 140°–220° C. for up to 30 minutes, preferably 4–10 minutes, with a peroxide-curing system containing a dialkyl peroxide such as di-1,1-bis(t-butylperoxy)-3,3,5-trimethylcyclohexane as the peroxide curing agent and m-phenylenediamine bis-maleimide as the coagent or promoter. A polyacrylate elastomer and hydrogenated nitrile rubber masterbatch is prepared in the customary manner and admixed with the curing system using conventional equipment, such as blenders, mixers, extruders or the like. The curable or vulcanizable composition, may contain, in addition to the curing system, a conventional lubricant such as stearic acid, a carbon black filler and an antioxidant. As is well known to those skilled in the art, compression set is an art-recognized measure of the extent of curing and is determined by compressing an article between flat plates for a specified time at the test temperature, after which the compressing force is released and the article allowed to recover for a specified period of time. The amount of unrecovered height, calculated as a percentage, is compression set.

Articles made from acrylic elastomer and hydrogenated nitrile rubber blends are processed in the same general manner as articles made from other elastomers, and can be shaped by compression, transfer or injection molding, with the latter being preferred. Articles made from conventionally vulcanized or cured polyacrylate parts are usually post-cured after primary curing because of the stringent requirements for articles to be used in automotive applications. As shown by their compression set values, articles made from the peroxide-cured polyacrylates of the present invention do not require post-curing.

Our invention is further illustrated by means of the following non-limiting examples:

EXAMPLE 1

This example illustrates compositions comprising a variety of polyacrylate elastomers admixed with the same partially hydrogenated nitrile rubber. (Example 1A does not contain a polyacrylate rubber and is not a composition according to the present invention).

The curable compositions were prepared by mixing all components, except for the curing system, in a Banbury mixer. The curing system, 1,1-bis(t-butylperoxy)-3,3,5-trimethylcyclohexane and m-phenylenediamine bis-maleimide, and antioxidant when utilized, were added, and the compositions uniformly blended using the Banbury mixer. The components of the curable compositions, the times and temperatures of curing, processing properties during curing and the properties of the cured product, including the results of tests on aged products, are summarized below.

|  | 1A | 1B | 1C | 1D | 1E | 1F |
|---|---|---|---|---|---|---|
| Nitrile rubber | 100.0 | 80.0 | 80.0 | 80.0 | 80.0 | 80.0 |
| Polyacylate I |  | 20.0 |  |  |  |  |
| Polyacylate II |  |  | 20.0 |  |  |  |
| Polyacylate III |  |  |  | 20.0 |  |  |
| Polyacylate IV |  |  |  |  | 20.0 |  |
| Polyacylate V |  |  |  |  |  | 20.0 |
| Carbon black | 50.0 | 50.0 | 50.0 | 50.0 | 50.0 | 50.0 |
| Magnesium oxide | 5.0 | 5.0 | 5.0 | 5.0 | 5.0 | 5.0 |
| Plasticizer | 5.0 | 5.0 | 5.0 | 5.0 | 5.0 | 5.0 |
| Amine antioxidant | 1.5 | 1.5 | 1.5 | 1.5 | 1.5 | 1.5 |
| 2-mercaptolimidazone | 0.5 | 0.5 | 0.5 | 0.5 | 0.5 | 0.5 |
| Peroxide | 8.0 | 8.0 | 8.0 | 8.0 | 8.0 | 8.0 |
| Bis-maleimide | 2.0 | 2.0 | 2.0 | 2.0 | 2.0 | 2.0 |
|  | 172.0 | 172.0 | 172.0 | 172.0 | 172.0 | 172.0 |

The nitrile rubber is a partially hydrogenated nitrile rubber containing about 36% of acrylonitrile having a degree of unsaturation of about 4%. Polyacrylate I contains about 55% by weight of structural units derived from ethyl acrylate and 45% by weight of structural units derived from n-butyl acrylate. Polyacrylates II–V contain about 6–23% by weight of structural units derived from ethyl acrylate, 47–62% by weight of structural units derived from butyl acrylate, about 26–30% by weight of structural units derived from methoxyethyl acrylate and 4–9% by weight of structural units derived from acrylonitrile.

The processess properties of the curable compositions were measured using a Mooney Viscometer, large rotor, at 125° C., and a rheometer oscillating disc using a microdie at 100 cpm, 3° arc at 190° C.

|  | 1A | 1B | 1C | 1D | 1E | 1F |
|---|---|---|---|---|---|---|
| MOONEY VISCOMETER: |  |  |  |  |  |  |
| VISC. MINIMUM | 58 | 45 | 47 | 47 | 47 | 45 |
| T5, minutes | 12.2 | 10.7 | 9.7 | 9.6 | 9.5 | 8.9 |
| REHEOMETER, MICRODIE |  |  |  |  |  |  |
| ML,1bf*in | 17.9 | 14.8 | 15.1 | 14.9 | 14.8 | 14.1 |
| ML,N*m | 2.0 | 1.6 | 1.7 | 1.6 | 1.6 | 1.6 |
| MH,1bf*in | 121.0 | 91.7 | 98.2 | 98.2 | 100.0 | 96.0 |
| MH,N*m | 13.4 | 10.2 | 10.9 | 10.9 | 11.1 | 10.7 |
| Ts2, minutes | 1.2 | 1.1 | 1.1 | 1.1 | 1.1 | 1.0 |
| T90, minutes | 13.0 | 11.9 | 11.5 | 11.3 | 11.6 | 11.8 |
| CURE RATE | 11.8 | 10.8 | 10.2 | 10.5 | 10.5 | 10.8 |

Properties of the cured composition, 20 minutes cure time at 170° C. with no post-cure, are as follows:

|  | 1A | 1B | 1C | 1D | 1E | 1F |
|---|---|---|---|---|---|---|
| STRESS 100%, psi | 1175 | 945 | 1010 | 1060 | 1065 | 1045 |
| STRESS 100%, MPa | 8.1 | 6.5 | 7.0 | 7.3 | 7.3 | 7.2 |
| TENSILE, psi | 3990 | 3150 | 3240 | 3435 | 3490 | 3200 |
| TENSILE, MPa | 27.5 | 21.7 | 22.4 | 23.7 | 24.1 | 22.1 |
| ELONGATION, % | 255 | 240 | 235 | 250 | 260 | 230 |
| HARDNESS, A pts | 75 | 72 | 73 | 71 | 70 | 74 |
| COMPRESSION SET, METHOD B, BUTTONS | | | | | | |
| 70 hrs @ 150° C. | 19 | 23 | 25 | 24 | 27 | 23 |
| 168 hrs @ 150° C. | 21 | 30 | 34 | 34 | 37 | 34 |
| GEHMAN LOW TEMPERATURE TORISON TEST, ASTM D1053 ORIGINAL ANGLE TWIST | | | | | | |
| T2, °C. | −20 | −16 | −16 | −16 | −15 | −15 |
| T5, °C. | −30 | −32 | −33 | −32 | −32 | −32 |
| LOW TEMPERATURE BRITTLENESS, ASTM D 2137 | | | | | | |
| Tp, °C. | −33 | −27 | −30 | −30 | −26 | −36 |

Stability of the peroxide cured acrylates to oxidation was measured using accelerated aging tests in which dumbbells cut from the material to be tested were exposed to circulating hot air in an oven. Their stability, when exposed to hot oil, a particularly important property from articles intended for automotive applications, was also measured. The results of aging the cured composition are summarized below:

| HEATING IN AIR OVEN | 1A | 1B | 1C | 1D | 1E | 1F |
|---|---|---|---|---|---|---|
| 70 hours at 150° C. | | | | | | |
| TENSILE, psi | 4195 | 3195 | 3615 | 3465 | 3265 | 3365 |
| TENSILE, MPa | 28.9 | 22.0 | 24.9 | 23.9 | 22.5 | 23.2 |
| TENSILE CHANGE, % | 5 | 1 | 12 | 1 | −6 | 5 |
| ELONGATION, % | 220 | 215 | 230 | 220 | 200 | 205 |
| ELONG, CHANGE, % | −14 | −10 | −2 | −12 | −23 | −11 |
| HARDNESS A, pt's | 81 | 79 | 79 | 80 | 79 | 80 |
| HARD CHANGE, pt's | 6 | 7 | 6 | 9 | 9 | 6 |
| 168 hours at 150° C. | | | | | | |
| TENSILE, psi | 3905 | 2895 | 3155 | 3135 | 3290 | 2825 |
| TENSILE, MPa | 26.9 | 20.0 | 21.8 | 21.6 | 22.7 | 19.5 |
| TENSILE CHANGE, % | −2 | −8 | −3 | .9 | −6 | −12 |
| ELONGATION, % | 205 | 195 | 185 | 200 | 195 | 165 |
| ELONG, CHANGE % | −20 | −19 | −21 | −20 | −25 | −28 |
| HARDNESS A, pt's | 79 | 77 | 81 | 82 | 81 | 80 |
| HARD CHANGE, pt's | 4 | 5 | 8 | 11 | 11 | 6 |
| 504 hours at 150° C. | | | | | | |
| TENSILE, psi | 3420 | 2705 | 3005 | 2980 | 3080 | 2875 |
| TENSILE, MPa | 22.4 | 18.7 | 20.7 | 20.6 | 21.3 | 19.8 |
| TENSILE CHANGE, % | −19 | −14 | −7 | −13 | −12 | −10 |
| ELONGATION, % | 120 | 120 | 120 | 120 | 130 | 110 |
| ELONG, CHANGE % | −53 | −50 | −49 | −52 | −50 | −52 |
| HARDNESS A, pt's | 84 | 80 | 84 | 87 | 87 | 85 |
| HARD CHANGE, pt's | 9 | 8 | 11 | 16 | 17 | 11 |
| 1008 hours at 150° C. | | | | | | |
| TENSILE, psi | 3420 | 2560 | 2775 | 2920 | 2720 | 2540 |
| TENSILE, MFs | 23.6 | 17.7 | 19.1 | 20.1 | 18.8 | 17.5 |
| TENSILE CHANGE, % | −14 | −19 | −14 | −15 | −22 | −21 |
| ELONGATION, % | 75 | 55 | 55 | 65 | 60 | 50 |
| ELONG CHANGE, % | −71 | −77 | −77 | −74 | −77 | −78 |
| HARDNESS A, pt's | 91 | 90 | 87 | 92 | 92 | 87 |
| HARD CHANGE, pt's | 16 | 18 | 14 | 21 | 22 | 13 |
| ASTM 903 OIL 70 hours at 150° C. | | | | | | |
| TENSILE, psi | 3540 | 2750 | 3130 | 3095 | 3415 | 2875 |
| TENSILE, MPa | 25.1 | 19.0 | 21.6 | 21.4 | 23.6 | 19.8 |
| TENSILE CHANGE, % | −9 | −13 | −3 | −10 | −2 | −10 |

| HEATING IN AIR OVEN | 1A | 1B | 1C | 1D | 1E | 1F |
|---|---|---|---|---|---|---|
| ELONGATION, % | 220 | 200 | 215 | 220 | 230 | 205 |
| ELONG, CHANGE, % | −14 | −17 | −9 | −12 | −12 | −11 |
| HARDNESS A, pt's | 69 | 64 | 67 | 67 | 67 | 64 |
| HARD CHANGE, pt's | −6 | −8 | −6 | −4 | −3 | −10 |
| VOLUME CHANGE, % | 14 | 15 | 14 | 12 | 12 | 15 |
| 168 hours at 150° C. | | | | | | |
| TENSILE, psi | 3640 | 2040 | 3165 | 2775 | 3265 | 2840 |
| TENSILE, MPa | 25.1 | 14.1 | 21.8 | 19.1 | 22.5 | 19.6 |
| TENSILE CHANGE, % | −9 | −35 | −2 | −19 | −6 | −11 |
| ELONGATION, % | 250 | 160 | 215 | 195 | 215 | 205 |
| ELONG CHANGE, % | −2 | −33 | −9 | −22 | −17 | −11 |
| HARDNESS A, pt's | 63 | 62 | 67 | 65 | 66 | 64 |
| HARD CHANGE, pt's | −12 | −10 | −6 | −6 | −4 | −10 |
| VOLUME CHANGE, % | | | | | | |

EXAMPLE 2

This example illustrates compositions comprising a variety of partially hydrogenated nitrile rubbers admixed with the same polyacrylate elastomer. The experimental and test procedures utilized were the same as those of Example 1. The polyacrylate contains about 55% by weight of structural units derived from ethyl acrylate and about 45% by weight of structural units derived from n-butyl acrylate. The nitrile rubbers are partially hydrogenated nitrile rubbers containing from about 17 to 50% by weight of acrylonitrile and having a degree of unsaturation in the range of about 91–99%. Those partially hydrogenated rubbers containing about 17–25% of acrylonitrile also contain units derived from a third monomer, such as an alkyl ester or a dialkyl ester of an unsaturated carboxylic acid. The components of the curable compositions, the times and temperatures of curing, processing properties during curing, and the properties of the cured product, including the results of tests on aged products, are summarized below:

| | 2A | 2B | 2C | 2D | 2E | 2F | 2G | 2H | 2I | 2J | 2K | 2L |
|---|---|---|---|---|---|---|---|---|---|---|---|---|
| Polyacralyte | 80.0 | 80.0 | 80.0 | 80.0 | 80.0 | 80.0 | 80.0 | 80.0 | 80.0 | 80.0 | 80.0 | 80.0 |
| Nitrile Rubber I | 20.0 | | | | | | | | | | | |
| Nitrile Rubber II | | 20.0 | | | | | | | | | | |
| Nitrile Rubber III | | | 20.0 | | | | | | | | | |
| Nitrile Rubber IV | | | | 20.0 | | | | | | | | |
| Nitrile Rubber V | | | | | 20.0 | | | | | | | |
| Nitrile Rubber VI | | | | | | 20.0 | | | | | | |
| Nitrile Rubber VII | | | | | | | 20.0 | | | | | |
| Nitrile Rubber VIII | | | | | | | | 20.0 | | | | |
| Nitrile Rubber IX | | | | | | | | | 20.0 | | | |
| Nitrile Rubber X | | | | | | | | | | 20.0 | | |
| Nitrile Rubber XI | | | | | | | | | | | 20.0 | |
| Nitrile Rubber XII | | | | | | | | | | | | 20.0 |
| Carbon black | 60.0 | 60.0 | 60.0 | 60.0 | 60.0 | 60.0 | 60.0 | 60.0 | 60.0 | 60.0 | 60.0 | 60.0 |
| Stearic Acid | 3.0 | 3.0 | 3.0 | 3.0 | 3.0 | 3.0 | 3.0 | 3.0 | 3.0 | 3.0 | 3.0 | 3.0 |
| Amine antioxidant | 2.0 | 2.0 | 2.0 | 2.0 | 2.0 | 2.0 | 2.0 | 2.0 | 2.0 | 2.0 | 2.0 | 2.0 |
| Peroxide | 3.0 | 3.0 | 3.0 | 3.0 | 3.0 | 3.0 | 3.0 | 3.0 | 3.0 | 3.0 | 3.0 | 3.0 |
| Bis-maleimide | 2.0 | 2.0 | 2.0 | 2.0 | 2.0 | 2.0 | 2.0 | 2.0 | 2.0 | 2.0 | 2.0 | 2.0 |
| TOTAL | 170.0 | 170.0 | 170.0 | 170.0 | 170.0 | 170.0 | 170.0 | 170.0 | 170.0 | 170.0 | 170.00 | 170.0 |
| PROCESSING PROPERTIES | | | | | | | | | | | | |
| MOONEY VISCOMETER: Large Rotor, 125° C. | | | | | | | | | | | | |
| VISC. MINIMUM | 46 | 45 | 45 | 45 | 45 | 44 | 44 | 44 | 42 | 42 | 42 | 42 |
| T5, minutes | 30 | 30 | 30 | 30 | 30 | 30 | 30 | 30 | 30 | 30 | 30 | 30 |
| RHEOMETER, MICRODIE, 100 cpm, 3° ARC | | | | | | | | | | | | |
| ML,lbf*in | 11.7 | 11.3 | 11.7 | 11.7 | 11.3 | 11.0 | 11.3 | 11.3 | 10.9 | 11.1 | 10.9 | 10.9 |
| ML,N*m | 1.3 | 1.3 | 1.3 | 1.3 | 1.3 | 1.2 | 1.3 | 1.3 | 1.2 | 1.2 | 1.2 | 1.2 |
| MH,lbf*in | 30.3 | 33.7 | 31.0 | 34.8 | 28.6 | 30.6 | 32.4 | 38.6 | 30.1 | 31.3 | 30.5 | 31.1 |
| MH,N*m | 3.4 | 3.7 | 3.4 | 3.9 | 3.2 | 3.4 | 3.6 | 4.3 | 3.3 | 3.5 | 3.4 | 3.5 |
| Ts2, minutes | 1.2 | 1.2 | 1.2 | 1.1 | 1.3 | 1.1 | 1.1 | 1.1 | 1.3 | 1.3 | 1.4 | 1.3 |
| T¹90, minutes | 2.6 | 2.9 | 2.7 | 2.8 | 2.7 | 2.6 | 2.8 | 3.3 | 2.6 | 2.7 | 2.7 | 2.7 |
| VULCANIZED PROPERTIES 4 minutes at 190° C. | | | | | | | | | | | | |
| STRESS 100%, psi | 835 | 920 | 1045 | 925 | 770 | 810 | 520 | 865 | 765 | 735 | 595 | 645 |
| STRESS 100%, MPa | 5.8 | 6.3 | 7.2 | 6.4 | 5.3 | 5.6 | 3.6 | 6.0 | 5.3 | 5.1 | 4.1 | 4.5 |
| TENSILE, psi | 1430 | 1250 | 1375 | 1355 | 1440 | 1360 | 1125 | 1335 | 1375 | 1285 | 1220 | 1235 |

-continued

|  | 2A | 2B | 2C | 2D | 2E | 2F | 2G | 2H | 2I | 2J | 2K | 2L |
|---|---|---|---|---|---|---|---|---|---|---|---|---|
| TENSILE, MPa | 9.9 | 8.6 | 9.5 | 9.3 | 9.9 | 9.4 | 7.8 | 9.2 | 9.5 | 8.9 | 8.4 | 8.5 |
| ELONGATION, % | 190 | 155 | 145 | 60 | 200 | 190 | 210 | 170 | 200 | 185 | 205 | 200 |
| HARDNESS, A pts | 72 | 77 | 75 | 72 | 70 | 72 | 70 | 73 | 66 | 70 | 67 | 68 |
| COMPRESSION SET, METHOD B, BUTTONS, cure time 6 minutes at 190° C. | | | | | | | | | | | | |
| 70 h @ 150° C. | 45 | 49 | 54 | 48 | 41 | 46 | 45 | 46 | 39 | 39 | 41 | 41 |
| 168 h @ 150° C. | 55 | 57 | 56 | 51 | 50 | 52 | 54 | 55 | 41 | 48 | 43 | 41 |
| GEHMAN LOW TEMPERATURE TORSION TEST | | | | | | | | | | | | |
| T2, °C. | 4 | 11 | 8 | 6 | 5 | 6 | 10 | 9 | 9 | 0 | 4 | 9 |
| T5, °C. | −12 | −3 | −7 | −8 | −11 | −9 | −9 | −9 | −9 | −16 | −13 | −8 |
| T10, °C. | −20 | −10 | −15 | −15 | −20 | −19 | −17 | −18 | −17 | −22 | −21 | −18 |
| T100, °C. | −32 | −29 | −31 | −32 | −32 | −31 | −30 | −31 | −32 | −35 | −34 | −34 |
| FREEZE PT, °C. | −30 | −20 | −27 | −28 | −34 | −33 | −33 | −33 | −34 | −35 | −37 | −37 |
| AGING: ENVIRONMENAIR OVEN 70 hours at 150° C. | | | | | | | | | | | | |
| Tensile, psi | 1135 | 1410 | 1415 | 1300 | 1480 | 1320 | 1065 | 1335 | 1095 | 1110 | 985 | 830 |
| Tensile, MPa | 9.2 | 9.7 | 9.8 | 9.0 | 10.2 | 9.1 | 7.3 | 9.2 | 7.6 | 7.7 | 6.8 | 5.7 |
| Tensile change, % | −7 | 13 | 3 | −4 | 3 | −3 | −5 | 0 | −20 | −14 | −19 | −33 |
| Elongation, % | 160 | 95 | 120 | 115 | 175 | 155 | 165 | 95 | 205 | 185 | 235 | 260 |
| Elong. Change, % | −16 | −39 | −17 | −28 | −13 | −18 | −21 | −44 | 3 | 0 | 15 | 30 |
| Hardness A, pt's | 81 | 87 | 84 | 88 | 80 | 83 | 83 | 83 | 78 | 79 | 75 | 77 |
| Hard change, pt's | 9 | 10 | 9 | 16 | 10 | 11 | 13 | 10 | 12 | 9 | 8 | 9 |
| 180° Bend | Pass | Pass | Pass | Pass | Pass | Pass | Pass | Pass | Pass | Pass | Pass | Pass |
| AGING: ENVIRONMENAIR OVEN 168 hours at 150° C. | | | | | | | | | | | | |
| TENSILE, psi | 1355 | 1315 | 1580 | 1425 | 1315 | 1340 | 1340 | 1495 | 1005 | 1015 | 885 | 745 |
| TENSILE, MPa | 9.3 | 9.1 | 10.9 | 9.8 | 9.1 | 9.2 | 9.2 | 10.3 | 6.9 | 7.0 | 6.1 | 5.1 |
| TENSILE CHANGE, % | −5 | 5 | 15 | 5 | −9 | −1 | 19 | 12 | −27 | −21 | −27 | −40 |
| ELONGATION, % | 145 | 76 | 110 | 80 | 165 | 115 | 95 | 60 | 205 | 170 | 250 | 255 |
| ELONG. CHANGE, % | −24 | −51 | −24 | −50 | −18 | −39 | −55 | −65 | 3 | −8 | 22 | 28 |
| HARDNESS A, pt's | 82 | 90 | 87 | 91 | 82 | 86 | 86 | 90 | 81 | 83 | 81 | 80 |
| HARD CHANGE, pt's | 10 | 13 | 12 | 19 | 12 | 14 | 16 | 17 | 15 | 13 | 14 | 12 |
| 180° BEND | Pass | Pass | Pass | Pass | Pass | Pass | Pass | FAIL | Pass | Pass | Pass | Pass |
| AGING: ENVIRONMENAIR OVEN 1008 hours at 150° C. | | | | | | | | | | | | |
| TENSILE, psi | 1430 | 2330 | 1840 | 2230 | 1460 | 1900 | 2030 | 2485 | 1370 | 1665 | 1195 | 1350 |
| TENSILE, MPa | 9.9 | 16.1 | 12.7 | 15.4 | 10.1 | 13.1 | 14.0 | 17.1 | 9.5 | 11.5 | 8.2 | 9.3 |
| TENSILE CHANGE, % | 0 | 86 | 34 | 65 | 1 | 40 | 80 | 86 | 0 | 30 | −2 | 9 |
| ELONGATION, % | 35 | 8 | 15 | 8 | 45 | 20 | 10 | 10 | 40 | 20 | 47 | 30 |
| ELONG. CHANGE | −82 | −95 | −90 | −95 | −78 | −89 | −95 | −94 | −80 | −89 | −77 | −85 |
| HARDNESS A, pt's | 95 | 92 | 88 | 94 | 93 | 86 | 96 | 96 | 93 | 90 | 93 | 94 |
| HARD CHANGE, pt's | 20 | 15 | 13 | 22 | 23 | 14 | 26 | 23 | 27 | 20 | 26 | 26 |
| 180° BEND | Fail | Fail | Fail | Fail | Pass | Fail | Fail | Fail | Fail | Fail | Pass | Fail |
| AGING: ASTM 903 OIL 70 hours at 150° C. | | | | | | | | | | | | |
| TENSILE, psi | 980 | 945 | 1070 | 975 | 1005 | 910 | 950 | 1020 | 975 | 890 | 750 | 715 |
| TENSILE, MPa | 6.8 | 6.5 | 7.4 | 6.7 | 6.9 | 6.3 | 6.6 | 7.0 | 6.7 | 6.1 | 5.2 | 4.9 |
| TENSILE CHANGE, % | −31 | −24 | −22 | −28 | −30 | −33 | −16 | −24 | −29 | −31 | −39 | −42 |
| ELONGATION, % | 180 | 120 | 135 | 125 | 185 | 165 | 165 | 125 | 185 | 155 | 170 | 165 |
| ELONG. CHANGE, % | −5 | −23 | −7 | −22 | −8 | −13 | −21 | −26 | −8 | −16 | −17 | −18 |
| HARDNESS A, pt's | 40 | 54 | 49 | 54 | 40 | 45 | 46 | 51 | 39 | 40 | 34 | 34 |
| HARD CHANGE, pt's | −32 | −23 | −26 | −18 | −30 | −27 | −24 | −22 | −27 | −30 | −33 | −34 |
| VOLUME CHANGE, % | 32 | 27 | 27 | 27 | 30 | 30 | 31 | 29 | 33 | 34 | 43 | 43 |
| 180° BEND | Pass | Pass | Pass | Pass | Pass | Pass | Pass | Pass | Pass | Pass | Pass | Pass |
| AGING: ASTM 903 OIL 168 hours at 150° C. | | | | | | | | | | | | |
| TENSILE, psi | 875 | 855 | 875 | 890 | 955 | 890 | 875 | 905 | 740 | 880 | 685 | 670 |
| TENSILE, MPa | 6.0 | 5.9 | 6.0 | 6.1 | 6.6 | 6.1 | 6.0 | 6.2 | 5.1 | 6.1 | 4.7 | 4.6 |
| TENSILE CHANGE, % | −39 | −32 | −36 | −34 | −34 | −35 | −22 | −32 | −46 | −32 | −44 | −46 |
| ELONGATION, % | 170 | 115 | 115 | 125 | 190 | 150 | 150 | 115 | 180 | 165 | 175 | 165 |
| ELONG. CHANGE, % | −11 | −26 | −21 | −22 | −5 | −21 | −29 | −32 | −10 | −11 | −15 | −18 |
| HARDNESS A, pt's | 43 | 5 | 51 | 53 | 41 | 46 | 47 | 51 | 39 | 40 | 34 | 35 |
| HARDNESS CHANGE, pt's | −29 | −22 | −24 | −19 | −29 | −26 | −23 | −22 | −27 | −30 | −33 | −33 |
| VOLUME CHANGE, % | 32 | 27 | 27 | 27 | 30 | 30 | 31 | 29 | 33 | 34 | 43 | 43 |
| 180° BEND | Pass | Pass | Pass | Pass | Pass | Pass | Pass | Pass | Pass | Pass | Pass | Pass |
| AGING: 10W40 OIL | | | | | | | | | | | | |

-continued

|  | 2A | 2B | 2C | 2D | 2E | 2F | 2G | 2H | 2I | 2J | 2K | 2L |
|---|---|---|---|---|---|---|---|---|---|---|---|---|
| 70 hours at 150° C. | | | | | | | | | | | | |
| TENSILE, psi | 1135 | 1225 | 1440 | 1345 | 1285 | 1140 | 1215 | 1005 | 1270 | 1210 | 1145 | 1150 |
| TENSILE, MPa | 7.8 | 8.5 | 9.9 | 9.3 | 8.9 | 7.9 | 8.4 | 6.9 | 8.8 | 8.3 | 7.9 | 7.9 |
| TENSILE CHANGE, % | −21 | −2 | 5 | −1 | −11 | −16 | 8 | −25 | −8 | −6 | −6 | −7 |
| ELONGATION, % | 85 | 155 | 110 | 80 | 170 | 125 | 100 | 140 | 150 | 115 | 175 | 155 |
| ELONG. CHANGE, % | −55 | 0 | −24 | −50 | −15 | −34 | −52 | 394 | −25 | −38 | −15 | −23 |
| HARDNESS A, pt's | 69 | 69 | 74 | 77 | 65 | 70 | 71 | 75 | 65 | 67 | 61 | 63 |
| HARD CHANGE, pt's | −3 | −8 | −1 | 5 | −5 | −2 | 1 | 3 | −1 | −3 | −6 | −5 |
| VOLUME CHANGE, % | 7 | 5 | 5 | 6 | 7 | 6 | 6 | 6 | 8 | 8 | 11 | 11 |
| 180° BEND | Pass | Pass | Pass | Pass | Pass | Pass | Pass | Pass | Pass | Pass | Pass | Pass |
| AGING: 10W40 OIL 168 hours at 150° C. | | | | | | | | | | | | |
| TENSILE, psi | 1230 | 1135 | 1335 | 1200 | 1265 | 1315 | 1325 | 1000 | 1165 | 1150 | 1125 | 1040 |
| TENSILE, MPa | 7.8 | 8.5 | 9.9 | 9.3 | 8.9 | 7.9 | 8.4 | 6.9 | 8.8 | 8.3 | 7.9 | 7.9 |
| TENSILE CHANGE, % | −21 | −2 | 5 | −1 | −11 | −16 | 8 | −25 | −8 | −6 | −6 | −7 |
| ELONGATION, % | 150 | 70 | 90 | 65 | 155 | 105 | 95 | 55 | 130 | 115 | 165 | 135 |
| ELONG. CHANGE, % | −55 | 0 | −24 | −50 | −15 | −34 | −52 | 394 | −25 | −38 | −15 | −23 |
| HARDNESS A, pt's | 70 | 81 | 75 | 78 | 70 | 73 | 74 | 78 | 67 | 67 | 61 | 63 |
| HARD CHANGE, pt's | −3 | −8 | −1 | 6 | −5 | −2 | 1 | 2 | −1 | −3 | −6 | −5 |
| VOLUME CHANGE, % | 6 | 5 | 5 | 6 | 6 | 6 | 6 | 6 | 8 | 7 | 11 | 10 |
| 180° BEND | Pass | Pass | Pass | Pass | Pass | Pass | Pass | Pass | Pass | Pass | Pass | Pass |

EXAMPLE 3

This example illustrates the effect of varying the relative proportions of the polyacrylate elastomer and the partially hydrogenated nitrile rubber in the mixture being peroxide-cured. Examples 3A and 3B are for comparative purposes and do not represent compositions within the scope of the present invention. The experimental and testing procedures utilized were the same as those of Example 1. The components of the curable compositions, the times and temperatures of curing, processing properties during curing and the properties of the cured product, including the results of aging tests, are summarized below:

|  | 3A | 3B | 3C | 3D | 3E | 3F | 3G | 3H | 3I |
|---|---|---|---|---|---|---|---|---|---|
| Polyacrylate | 100.0 | 95.0 | 90.0 | 85.0 | 80.0 | 70.0 | 70.0 | 60.0 | 60.0 |
| Nitrile rubber | | 5.0 | 10.0 | 15.0 | 20.0 | 30.0 | 30.0 | 40.0 | 40.0 |
| Carbon | 60.0 | 60.0 | 60.0 | 60.0 | 60.0 | 60.0 | 60.0 | 60.0 | 60.0 |
| Stearic Acid | 3.0 | 3.0 | 3.0 | 3.0 | 3.0 | 3.0 | 3.0 | 3.0 | 3.0 |
| Amine antioxidant | 2.0 | 2.0 | 2.0 | 2.0 | 2.0 | 2.0 | 2.0 | 2.0 | 2.0 |
| Peroxide | 2.0 | 2.0 | 2.0 | 2.0 | 2.0 | 2.0 | 3.0 | 2.0 | 3.0 |
| Bis-maleimide | 2.0 | 2.0 | 2.0 | 2.0 | 2.0 | 2.0 | 2.0 | 2.0 | 2.0 |
| TOTAL | 169.0 | 169.0 | 169.0 | 169.0 | 169.0 | 169.0 | 170.0 | 169.0 | 170.0 |
| PROCESSING PROPERTIES | | | | | | | | | |
| MOONEY VISCOMETER: | | | | | | | | | |
| VISC. MINIMUM | 36 | 42 | 44 | 45 | 46 | 49 | 49 | 51 | 51 |
| T5, minutes | 30 | 30 | 30 | 30 | 30 | 30 | 30 | 30 | 30 |
| RHEOMETER, MICRODIE, 100 cpm, 3° ARC at 190° C. | | | | | | | | | |
| ML,lbf*in | 8.2 | 10.7 | 11.5 | 11.5 | 11.5 | 11.9 | 11.7 | 11.9 | 12.0 |
| ML,N + m | 0.9 | 1.2 | 1.3 | 1.3 | 1.3 | 1.3 | 1.3 | 1.3 | 1.3 |
| MH,lbf*in | 20.0 | 24.0 | 25.0 | 25.0 | 25.0 | 29.0 | 29.0 | 30.0 | 31.0 |
| MH,N*m | 2.2 | 2.7 | 2.8 | 2.8 | 2.8 | 3.2 | 3.2 | 3.3 | 3.4 |
| Ts2, minutes | 1.6 | 1.5 | 1.5 | 1.5 | 1.5 | 1.6 | 1.5 | 1.5 | 1.5 |
| $T^1$ 90, minutes | 5.1 | 3.7 | 3.3 | 3.6 | 3.5 | 4.4 | 4.3 | 4.5 | 4.3 |
| VULCANIZED PROPERTIES | | | | | | | | | |
| CURE TIME 4 minutes at 190° C. | | | | | | | | | |
| STRESS 100%, psi | 250 | 420 | 545 | 625 | 610 | 680 | 675 | 725 | 675 |
| STRESS 100%, MPa | 1.7 | 2.9 | 3.8 | 4.3 | 4.2 | 4.7 | 4.7 | 5.0 | 4.7 |
| TENSILE, psi | 980 | 1015 | 1170 | 1270 | 1365 | 1640 | 1660 | 1910 | 1920 |
| TENSILE, MPa | 6.8 | 7.0 | 8.1 | 8.8 | 9.4 | 11.3 | 11.5 | 13.2 | 13.2 |
| ELONGATION, % | 325 | 270 | 265 | 240 | 255 | 240 | 250 | 280 | 280 |
| HARDNESS, A pts | 54 | 67 | 69 | 68 | 70 | 71 | 73 | 76 | 75 |
| COMPRESSION SET, METHOD B, CURE TIME 6 minutes at 190° C. | | | | | | | | | |
| BUTTONS 70 hrs @ 150° C. | 39 | 34 | 37 | 40 | 40 | 46 | 49 | 53 | 55 |

|  | 3A | 3B | 3C | 3D | 3E | 3F | 3G | 3H | 3I |
|---|---|---|---|---|---|---|---|---|---|
| AGING: ENVIRONMENT AIR OVEN 70 hours at 175° C. | | | | | | | | | |
| TENSILE, psi | 770 | 835 | 935 | 1105 | 1320 | 1460 | 1525 | 1810 | 1775 |
| TENSILE, MPa | 6.1 | 5.8 | 6.5 | 7.6 | 9.1 | 10.1 | 10.5 | 12.5 | 12.2 |
| TENSILE CHANGE, % | −21 | −18 | −20 | −13 | −3 | −11 | −8 | −5 | −8 |
| ELONGATION, % | 285 | 235 | 175 | 150 | 140 | 130 | 140 | 145 | 135 |
| ELONG. CHANGE, % | −12 | −13 | −34 | −38 | −45 | −46 | −44 | −48 | −52 |
| HARDNESS A, pt's | 72 | 84 | 86 | 86 | 88 | 88 | 89 | 88 | 89 |
| HARD CHANGE, pt's | −81 | −17 | −17 | −18 | −18 | −17 | −16 | −12 | −14 |
| 180° BEND | Pass | Pass | Pass | Pass | Pass | Pass | Pass | Pass | Pass |
| AGING: ASTM 902 Oil 70 hours at 150° C. | | | | | | | | | |
| TENSILE, psi | 975 | 1005 | 1125 | 1250 | 1370 | 1635 | 1625 | 1955 | 1920 |
| TENSILE, MPa | 6.7 | 6.9 | 7.8 | 8.6 | 9.5 | 11.3 | 11.2 | 13.5 | 13.2 |
| TENSILE CHANGE, % | −1 | −1 | −4 | −2 | 0 | 0 | −2 | 2 | 0 |
| ELONGATION, % | 355 | 315 | 255 | 255 | 245 | 250 | 230 | 255 | 265 |
| ELONG. CHANGE, % | 9 | 17 | −4 | 6 | −4 | 4 | −8 | −9 | −5 |
| HARDNESS A, pt's | 46 | 53 | 59 | 60 | 62 | 65 | 64 | 68 | 68 |
| HARD CHANGE, pt's | −8 | −14 | −10 | −8 | −8 | −6 | −9 | −8 | −7 |
| VOLUME CHANGE, % | 12 | 10 | 10 | 10 | 9 | 10 | 9.5 | 9 | 9 |
| 180° BEND | Pass | Pass | Pass | Pass | Pass | Pass | Pass | Pass | Pass |
| AGING: ENVIRONMENT ASTM 903 OIL 70 hours at 150° C. | | | | | | | | | |
| TENSILE, psi | 700 | 730 | 820 | 875 | 100 | 1235 | 1225 | 1565 | 1345 |
| TENSILE, MPa | 4.8 | 5.0 | 5.7 | 6.0 | 6.9 | 8.5 | 8.5 | 10.8 | 9.3 |
| TENSILE CHANGE, % | −29 | −28 | −30 | −31 | −27 | −25 | −26 | −18 | −30 |
| ELONGATION, % | 265 | 230 | 230 | 225 | 215 | 215 | 235 | 250 | 225 |
| ELONG. CHANGE, % | −18 | −15 | −13 | −6 | −16 | −10 | −6 | −11 | −20 |
| HARDNESS A, pt's | 26 | 33 | 36 | 38 | 40 | 44 | 45 | 49 | 49 |
| HARD CHANGE, pt's | −28 | −34 | −33 | −30 | −30 | −27 | −28 | −27 | −26 |
| VOLUME CHANGE, % | 43 | 39 | 38 | 36 | 34 | 32 | 32 | 28 | 29 |
| 180° BEND | Pass | Pass | Pass | Pass | Pass | Pass | Pass | Pass | Pass |

EXAMPLE 4

This example, like the previous example, illustrates the effect, in a somewhat different formulation, of varying the proportions of the polyacrylate elastomer and the partially hydrogenated nitrile rubber in the mixture being peroxide-cured. Examples 4A and 4B are for comparative purposes and do not represent compositions within the scope of the present invention. The experimental and test procedures utlized were the same as those of Example 1. The components of the curable composition, the times and temperatures of curing, processing conditions during curing and the properties of the cured product, including the results of testing of the aged products, are summarized below:

|  | 4A | 4B | 4C | 4D | 4E | 4F | 4G |
|---|---|---|---|---|---|---|---|
| Nitrile Rubber | 100.0 | 100.0 | 90.0 | 80.0 | 80.0 | 70.0 | 70.0 |
| Polyacylate |  | 5.0 | 10.0 | 20.0 | 20.0 | 30.0 | 30.0 |
| Carbon black | 50.0 | 50.0 | 50.0 | 50.0 | 50.0 | 50.0 | 50.0 |
| Magnesium Oxide | 5.0 | 5.0 | 5.0 | 5.0 | 5.0 | 5.0 | 5.0 |
| Stearic acid | 0.5 | 0.5 | 0.5 | 0.5 | 0.5 | 0.5 | 0.5 |
| Plasticizer | 5.0 | | | | | | |
| Amine antioxidant | 1.5 | 1.5 | 1.5 | 1.5 | 1.5 | 1.5 | 1.5 |
| Vanox MTI | 0.5 | 0.5 | 0.5 | 0.5 | 0.5 | 0.5 | 0.5 |
| Peroxide | 8.0 | 8.0 | 8.0 | 8.0 | 8.0 | 8.0 | 8.0 |
| Bis-Maleimide | 2.0 | 2.0 | 2.0 | 2.0 | 2.0 | 2.0 | 2.0 |
| TOTAL: | 172.5 | 172.5 | 167.5 | 167.5 | 167.5 | 167.5 | 167.5 |
| PROCESSING PROPERTIES | | | | | | | |
| MOONEY VISCOMETER: Large Rotor, 125° C. | | | | | | | |
| VISC. MINIMUM | 48 | 54 | 52 | 48 | 48 | 42 | 42 |
| T5, minutes | 21 | 18.5 | 19.8 | 18.4 | 19 | 18.4 | 17.6 |
| RHEOMETER, MICRODIE, 100 cpm, 3° ARC at 170° C. | | | | | | | |
| ML,lbf*IN | 14.8 | 17.5 | 16.5 | 14.4 | 15.1 | 13.4 | 14.5 |
| ML,N*m | 1.6 | 1.9 | 1.8 | 1.6 | 1.7 | 1.5 | 1.6 |
| MH,lbf*in | 115.0 | 118.0 | 115.0 | 102.0 | 102.0 | 91.0 | 87.5 |
| MH,N*m | 12.8 | 13.1 | 12.8 | 11.3 | 11.3 | 10.1 | 9.7 |

| | 4A | 4B | 4C | 4D | 4E | 4F | 4G |
|---|---|---|---|---|---|---|---|
| Ts2, minutes | 1.3 | 1.3 | 1.3 | 1.2 | 1.2 | 1.2 | 1.2 |
| T'90, minutes | 12.5 | 13.0 | 13.1 | 13.5 | 13.5 | 13.0 | 12.5 |
| VULCANIZED PROPERTIES CURE TIME 20 minutes at 170° C. | | | | | | | |
| STRESS 100%, psi | 1060 | 1075 | 1235 | 1175 | 1145 | 1120 | 1105 |
| STRESS 100%, MPa | 7.3 | 7.4 | 8.5 | 8.1 | 7.9 | 7.7 | 7.6 |
| TENSILE, psi | 3940 | 3780 | 3670 | 3265 | 2465 | 3085 | 2870 |
| TENSILE, MPa | 27.2 | 26.1 | 25.3 | 22.5 | 17.0 | 21.3 | 19.8 |
| ELONGATION, % | 265 | 260 | 235 | 225 | 170 | 225 | 220 |
| HARDNESS, A pts | 73 | 75 | 77 | 75 | 75 | 73 | 73 |
| COMPRESSION SET, METHOD B, BUTTONS 70 hrs @ 150° C. % | 21 | 22 | 23 | 26 | 24 | 27 | 26 |
| GEHMAN LOW TEMPERATURE TORSION | | | | | | | |
| T2, °C. | −18 | −17 | −17 | −15 | −15 | −13 | −18 |
| T5, °C. | −23 | −22 | −22 | −21 | −22 | −22 | −23 |
| T10, °C. | −26 | −24 | −24 | −23 | −24 | −24 | −25 |
| T100, °C. | −32 | −30 | −30 | −30 | −30 | −30 | −35 |
| FREEZE PT, °C. | −31 | −29 | −30 | −27 | −29 | −30 | −30 |
| AGING: ENVIRONMENT AIR OVEN 70 hours at 150° C. | | | | | | | |
| TENSILE, psi | 4135 | 4055 | 3565 | 3375 | 3280 | 2805 | 2860 |
| TENSILE, MPa | 28.5 | 28.0 | 24.6 | 23.3 | 22.6 | 19.4 | 19.7 |
| TENSILE CHANGE, % | 5 | 7 | −3 | 3 | 33 | −9 | 0 |
| ELONGATION, % | 240 | 230 | 200 | 205 | 190 | 175 | 185 |
| ELONG. CHANGE, % | −9 | −12 | −15 | −9 | 12 | −22 | −16 |
| HARDNESS A, pt's | 80 | 80 | 81 | 81 | 81 | 78 | 79 |
| HARD CHANGE, pt's | 7 | 5 | 4 | 6 | 6 | 5 | 6 |
| 180° BEND | Pass | Pass | Pass | Pass | Pass | Pass | Pass |
| AGING: ENVIRONMENT ASTM 903 OIL 70 hours at 150° C. | | | | | | | |
| TENSILE, psi | 3085 | 3475 | 3225 | 2985 | 2405 | 2345 | 2320 |
| TENSILE, MPa | 21.3 | 24.0 | 22.3 | 20.6 | 16.6 | 16.2 | 16.0 |
| TENSILE CHANGE, % | −22 | −8 | −12 | −9 | −2 | −24 | −19 |
| ELONGATION, % | 215 | 235 | 225 | 215 | 235 | 185 | 180 |
| ELONG. CHANGE, % | −19 | −10 | −4 | −4 | 38 | −18 | −18 |
| HARDNESS A, pt's | 65 | 66 | 68 | 65 | 68 | 61 | 62 |
| HARD CHANGE, pt's | −8 | −9 | −9 | −10 | −7 | −12 | −11 |
| VOLUME CHANGE, % | 13 | 17 | 17 | 19 | 19 | 20 | 20 |
| 180° BEND | Pass | Pass | Pass | Pass | Pass | Pass | Pass |

Our invention has been described in terms of specific embodiments and non-limiting examples. Various modifications in the compositions of the present invention will be apparent to those skilled in the art and are included within the scope of the invention.

What is claimed is:

1. A peroxide-cured blend consisting essentially of:

10 to 90 parts by weight of a polyacrylate elastomer comprising at least 10 mole % of the structural unit

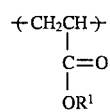

wherein $R^1$ is a $C_{4-8}$ alkyl group;
   up to 30 mole % of the structural unit

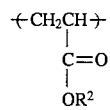

wherein $R^2$ is an alkoxyalkyl group containing 2–12 carbon atoms; and the balance to a total of 100 mole % of the structural unit

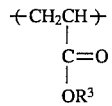

wherein $R^3$ is a $C_{1-3}$ alkyl group; and

90–10 parts by weight of a partially hydrogenated nitrile rubber having a degree of unsaturation of from 0.1 to 20%.

2. A peroxide-cured blend according to claim 1, comprising 20 to 30 mole % of the structural unit

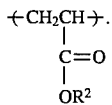

3. A peroxide-cured blend according to claim 1, wherein $R^1$ is n-butyl, $R^2$ is methoxyethyl and $R^3$ is ethyl.

4. A peroxide-cured blend consisting essentially of:

10 to 90 parts by weight of a polyacrylate elastomer comprising at least 10 mole % of the structural unit

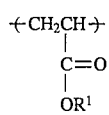

wherein $R^1$ is a $C_{4-8}$ alkyl group;
up to 30 mole % of the structural unit

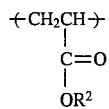

wherein $R^2$ is an alkoxylakyl group containing 2–12 carbon atoms;
1 to 10 mole % of the structural unit

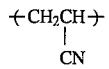

and the balance to a total of 100 mole % of the structural unit

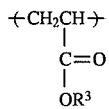

wherein $R^3$ is a $C_{1-3}$ alkyl group; and
10 to 90 parts by weight of a hydrogenated nitrile rubber having a degree of unsaturation of 1 to 20%.

5. A peroxide-cured blend according to claim 4, comprising 20 to 30 mole % of the structural unit

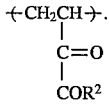

6. A peroxide-cured blend according to claim 4, wherein $R^1$ is n-butyl, $R^2$ is methoxyethyl and $R^3$ is ethyl.

7. A peroxide-curable composition consisting essentially of a blend of:
10 to 90 parts by weight of a polyacrylate elastomer comprising at least 10 mole % of the structural unit

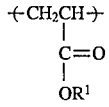

wherein $R^1$ is a $C_{4-8}$ alkyl group;
up to 30 mole % of the structural unit

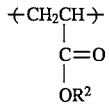

wherein $R^2$ is an alkoxyalkyl group containing 2–12 carbon atoms; and the balance to a total of 100 mole % of the structural unit

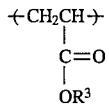

wherein $R^3$ is a $C_{1-3}$ alkyl group;

90 to 10 parts by weight of a hydrogenated nitrile rubber having a degree of unsaturation of from 0.1 to 20%; and
a peroxide curing system.

8. A peroxide-curable composition according to claim 7 wherein the peroxide curing system comprises di-1,1-bis (t-butylperoxy)-3,3,4-trimethylcyclohexane and m-phenylenediamine bis-maleimide.

9. A peroxide curable composition blend according to claim 7, consisting essentially of 20 to 30 mole % of the structural unit

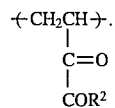

10. A peroxide-curable composition which comprises a blend of:
10 to 90 parts by weight of a polyacrylate elastomer comprising at least 10 mole % of the structural unit

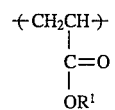

wherein $R^1$ is a $C_{4-8}$ alkyl group;
up to 30 mole % of the structural unit

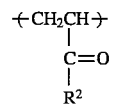

wherein $R^2$ is an alkoxylalkyl group containing 2–12 carbon atoms; 1 to 10 mole % of the structural unit

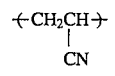

and the balance to a total of 100 mole % of the structural unit

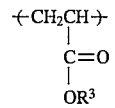

wherein $R^3$ is a $C_{1-3}$ alkyl group;
90 to 10 parts by weight of a hydrogenated nitrile rubber having a degree of unsaturation of from 0.1 to 20%; and
a peroxide curing system.

11. A peroxide-curable composition according to claim 10, wherein the peroxide curing system comprises an organic peroxide and m-phenylenediamine bis-maleimide.

12. A peroxide-cured blend according to claim 10, consisting essentially of 20 to 30 mole % of the structural unit

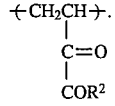

* * * * *